United States Patent [19]

Yoshii et al.

[11] 4,235,365
[45] Nov. 25, 1980

[54] THREE-LAYERED POLYPROPYLENE FILMS

[75] Inventors: Toshiya Yoshii; Toshihiro Yamane, both of Ohtsu; Yasuo Saito, Kusatsu, all of Japan

[73] Assignee: Toray Industries, Inc., Tokyo, Japan

[21] Appl. No.: 80,300

[22] Filed: Oct. 1, 1979

Related U.S. Application Data

[63] Continuation of Ser. No. 890,943, Mar. 28, 1978, abandoned.

[30] Foreign Application Priority Data

Apr. 15, 1977 [JP] Japan .................................. 52-42645

[51] Int. Cl.³ .................................................. B32B 7/02
[52] U.S. Cl. ...................................... 229/55; 428/215; 428/35; 428/516; 229/3.5 R; 229/48 T
[58] Field of Search ................. 428/215, 35, 212, 516; 229/53, 3.5 R, 48 T

[56] References Cited

U.S. PATENT DOCUMENTS

| | | | |
|---|---|---|---|
| 3,508,944 | 4/1970 | Henderson | 264/95 X |
| 3,540,979 | 11/1970 | Hughes | 428/516 X |
| 3,620,825 | 11/1971 | Lohmann | 428/516 |
| 3,671,383 | 6/1972 | Sakata et al. | 428/516 |
| 3,887,745 | 6/1975 | Yoshii et al. | 428/516 |

FOREIGN PATENT DOCUMENTS

| | | |
|---|---|---|
| 1055803 | 1/1967 | United Kingdom . |
| 1145199 | 3/1969 | United Kingdom . |
| 1172643 | 12/1969 | United Kingdom . |
| 1440317 | 6/1976 | United Kingdom . |

*Primary Examiner*—George F. Lesmes
*Assistant Examiner*—E. Rollins Buffalow
*Attorney, Agent, or Firm*—Stevens, Davis, Miller & Mosher

[57] ABSTRACT

This invention relates to a three-layered polypropylene film consisting of a core layer of biaxially oriented polypropylene sandwiched between ethylene-propylene copolymer layers having a different degree of molecular orientation, shown by birefringence, i.e., birefringence of one copolymer layer is different from that of the other copolymer layer. The film thus prepared has not only a good heat sealing property but also a good resistance against "hot-tack", "blocking", and "scratches". The film can be provided by a process wherein one copolymer layer is biaxially stretched, while the other copolymer layer is uniaxially stretched. Three-layered films of this invention are particularly suited for making bags with lap sealed parts, where lap sealing is a heat sealing method characterized by heat sealing one side of a film with the other side of the film.

6 Claims, 4 Drawing Figures

U.S. Patent    Nov. 25, 1980    4,235,365
FIG. 1
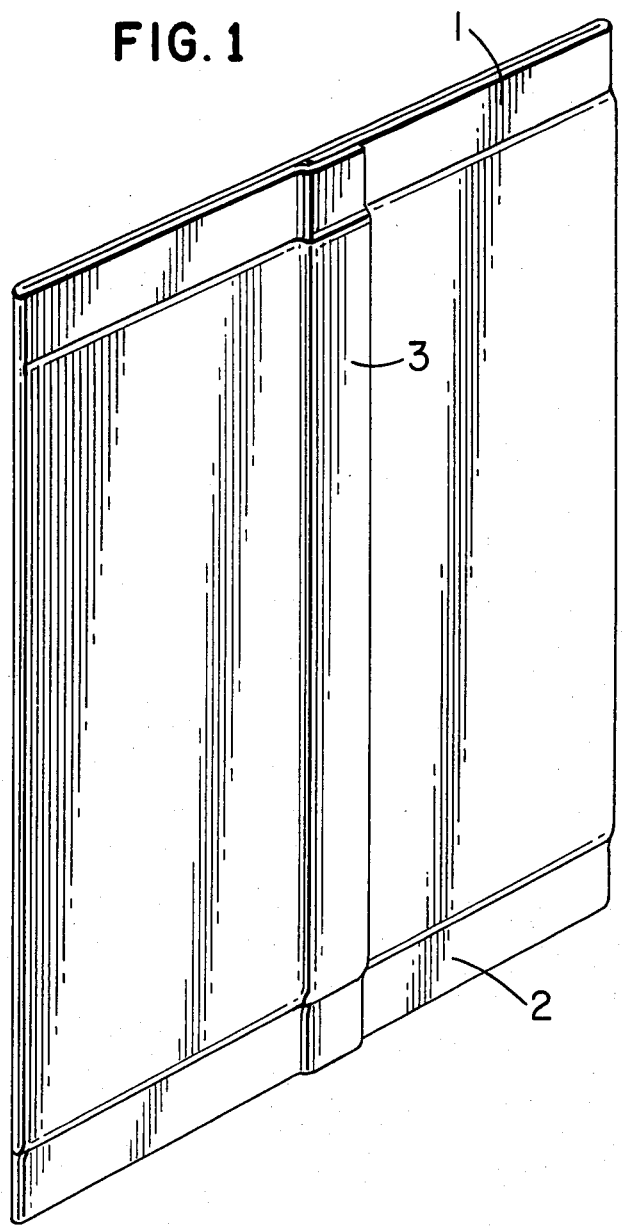
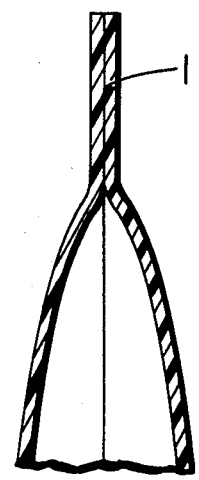
FIG. 2
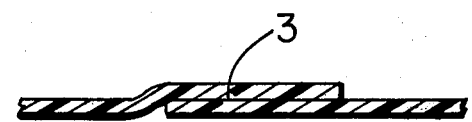
FIG. 3
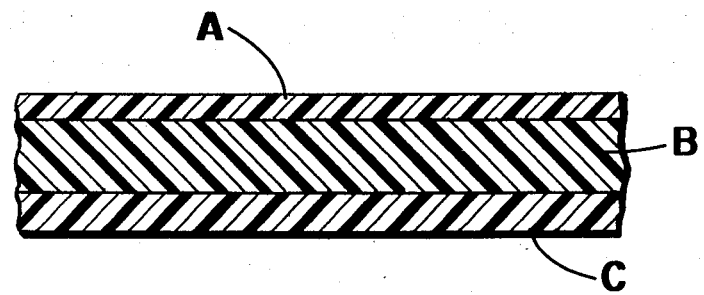
FIG. 4

THREE-LAYERED POLYPROPYLENE FILMS

This is a continuation of application Ser. No. 890,943 filed Mar. 28, 1978, which is now abandoned.

BACKGROUND OF THE INVENTION

FIG. 1 shows a typical bag made of a polymer film by automatic packaging machines or bag-making machines, where 1 is the top seal, 2 is the bottom seal and 3 is the back seal. All of these seals are made by heat sealing one end of the film with the other end of the film. There are two kinds of heat sealing methods shown in FIGS. 2 and 3. The heat sealing method shown in FIG. 2 is called a "fin-seal"; in this method, one inner side of the bag is heat sealed with the other inner side of the bag. On the other hand, the heat sealing method in FIG. 3 is called a "lap-seal"; in a "lap-seal", an inner side of the bag is heat sealed with an outer side of the bag.

The three-layered polypropylene film of this invention is particularly suitable for forming bags with a "lap-seal". There are many two-layered polypropylene films used in the market, consisting of a biaxially oriented polypropylene film (hereinafter referred to as PP-BO) and a laminated ethylenepropylene copolymer (hereinafter referred to as EPC) layer. However, these two-layered films cannot be used to form a lap-seal, because the sealability of the PP-BO is so poor that good heat sealing cannot be achieved between the PP-BO and the EPC sides. Three-layered polypropylene films, consisting of a core layer of PP-BO sandwiched by two EPC layers, are also well-known in the patent literature, such as Japanese Pat. Nos. 46-31478, 47-39225, 47-45951, and 48-4189, U.S. Pat. Nos. 3,620,825 and 3,671,383, and British Pat. Nos. 1,055,803, 1,172,643 and 1,440,317. Due to EPC layers on both sides of the films, these three-layered films can be used for lap-seal. However, these films have a quality defect of either (1) poor heat sealability, or (2) poor resistance against "hot-tack", "blocking" and "scratches".

In these three-layered films of the prior art, a film with good heat sealability has poor resistance, while a film with good resistance has poor heat sealability. For example, the three-layered films made by the methods in Japanese Pat. No. 46-31478 or U.S. Pat. No. 3,671,383 are good in heat sealability but poor in resistance against "hot-tack" etc. On the other hand, the three-layered films made by the methods in Japanese Pat. No. 47-39225 or British Pat. No. 1,172,643 are good in resistance but poor in heat sealability. Good heat sealability, as used herein, means that the film can be heat sealed over a wide range of temperatures, and that the heat sealed parts have a sufficient heat seal strength, e.g., more than 200 g/cm.

"Hot-tack" is a phenomenon wherein the hot heat sealing bar sticks to the film when the film is heat sealed in the automatic packaging machines or bag-making machines. It is easily understood that smooth packaging operations cannot be made if "hot-tack" occurs. The film with heat sealing layers on both sides is particularly vulnerable to "hot-tack", because the hot sealing bar directly contacts the heat sealing layers. It is readily apparent that "hot-tack" is an undesirable property in packaging applications.

"Blocking" is a phenomenon wherein the film surfaces stick to other film surfaces. This often happens during storage of the films, bags or packages. A film with a "blocking" propensity is inconvenient in handling because it takes time to separate the blocked films, bags or packages. Hence, "blocking" is also an undesirable property in packaging applications.

"Scratches" are fine lines or marks resulting from mechanical friction between films or film and other materials, i.e., "scratches" take place on the film surface when a film is rubbed with another film or material. Good appearance, or clarity, of the film is damaged by "scratches", so that good resistance against "scratches" is required for packaging films.

SUMMARY AND OBJECTS OF THE INVENTION

An object of this invention is to provide three-layered films having good heat sealability and good resistance against "hot-tack", "blocking" and "scratches".

A second object of this invention is to provide three-layered films heat sealable on both surfaces and easily applicable for automatic packaging or bag-making machines. A further object of this invention is to provide a continuous process for making such films.

Still another object of the invention is the making of bags from the film of the invention.

In accordance with the invention, a three-layered film is formed having a polypropylene layer sandwiched between EPC layers wherein a different birefringence is created in each EPC layer. Namely, the birefringence value of one EPC layer is kept very low, i.e., in the range of 0 to 0.0010, while the birefringence value of the other EPC layer is kept relatively high, i.e., in the range of 0.0015 to 0.0150.

Such films can be made by a continuous method including both co-extrusion and extrusion-laminating techniques.

The films of this invention are suitable not only for lap-sealing packaging machines, but also for the other conventional packaging or bag-making machines. Hence, the films of this invention can be widely used in general packaging applications.

In the case of making bags from this film, the low birefringence side should form the inner side of the bag.

Other objects, characteristics or advantages of this invention will be fully understood in the following description.

BRIEF DESCRIPTION OF THE DRAWINGS

FIG. 1 is a diagramatic view of a plastic film bag.

FIG. 2 shows a "fin-seal", in which the inner sides of the bag are sealed together.

FIG. 3 shows a "lap-seal", in which an inner side is sealed with an outer side of the bag.

FIG. 4 is a cross-sectional view of the film of the present invention.

The nomenclature in the drawings is as follows:
1: Top Seal
2: Bottom Seal
3: Back Seal
A: Ethylene-propylene copolymer layer with high value of birefringence
B: Biaxially oriented polypropylene layer
C: Ethylene-propylene copolymer layer with low value of birefringence.

DESCRIPTION OF PREFERRED EMBODIMENTS

This invention is a novel three-layered film having good heat sealability and, at the same time, good resistance against "hot-tack", "blocking" and "scratches". Such film is particularly useful in packaging applications.

In FIG. 4, showing a cross section of a film according to the invention, an EPC layer A has a relatively high birefringence value ranging from 0.0015 to 0.0150, and, preferably, from 0.0030 to 0.0100. If the value is lower than the above range, the resistance against "hot-tack", etc. becomes unsatisfactory. On the other hand, if this value is higher than the above range, unsatisfactory heat sealability results when EPC layer A is lap-sealed with EPC layer C, such as at the back seal of a bag.

EPC layer C has a relatively low birefringence value, ranging from 0 to 0.0010. If the value is higher than 0.0010, heat sealability becomes unsatisfactory in fin-sealed parts of the bags, such as where two EPC layers C are fin-sealed together at the top and bottom of the bags. It should be noted that a "lap-seal" is made between A and C layers, while "fin-seal" is made between two C layers. Typical bags are made from the present films in such a way that layer A is placed outside and layer C inside of the bags, and the top and bottom of the bags are fin-sealed, while the backs of the bags are lap-sealed. This description is not intended to exclude from the scope of the present invention other ways of bag-making or heat sealing. "Hot-tack" trouble during heat sealing, which has been previously described, is greatly reduced by making layer A, having a high birefringence value, form the outside of the bag. It has been found by the inventors that the EPC layer with a high birefringence value has a good resistance against "hot-tack". Furthermore, "blocking" of the stacked bags and "scratches" caused by rubbing are also reduced by making the high birefringence value layer A form the outside of the bag. Good heat sealability is achieved in top and bottom seals of the bag by having the low birefringence layer C form the inside of the bag, because low birefringence layer C is heat sealed with facing low birefringence layer C by the fin-sealing method. It has been found that good heat sealability is achieved even in the case of heat sealing high birefringence layer A with low birefringence layer C by means of lap sealing method. Although heat sealability is poor between two high birefringence A layers, good heat sealability can be achieved between high and low birefringence layers, i.e., between A and C layers. The degree of heat sealability between A and C layers is almost as good as that between two C layers. This fact leads to the conlusion that a good back seal of the bag can be achieved by means of the lap-seal method in which layer A is heat sealed with layer C.

Birefringence is defined as the absolute value of the difference between the longitudinal and transverse refractive indexes in the film. This is usually measured by Abbe's refractometer, lighted by a sodium lamp. The birefringence value of a core PP-BO layer, which is not restricted in this invention, usually ranges from 0.0100 to 0.0250 and is higher than the birefringence value of the high birefringence EPC layer (layer A).

The following advantages, (1) through (5), are found in bags made in such a way that (a) high birefringence layer A forms the outside of the bag, (b) low birefringence layer C forms the inside of the bag, (c) the top and bottom of the bag are fin-sealed between facing C layers, (d) the back of the bag is lap-sealed between A and C layers:

(1) Good heat seal strength. Hence there is little probability of bag-breaking during transportation.

(2) The bags are easy to open, because strength of the back seal is slightly weaker than that of top and bottom seal. Bag-breaking trouble is not caused by the slightly weaker back seal, for the back-sealed part does not bear so heavy a load as the top or bottom sealed parts.

(3) Good scratch resistance of the outer sides of the bags. Hence, the bags keep good appearance for a long time.

(4) Little blocking tendency of the bags. Hence, many bags can be stacked without sticking.

(5) Good clarity of the bags.

Total thickness of the present film is preferred to be in the range of 20 to 60 microns. Films thinner than 20 microns have a creasing propensity in the automatic packaging machines because of a lack of rigidity in the films. On the other hand, films thicker than 60 microns have economical disadvantages and poor efficiency in heat sealing due to poor heat conductivity. The thickness of high birefringence layer A is preferred to be in the range of 0.5 to 3.0 microns. If thinner than 0.5 microns, the film loses good heat sealability in forming a lap-seal. If thicker than 3.0 microns, the film loses good resistance against "hot-tack" during heat sealing. The thickness of low birefringence layer C is preferred to be in the range of 3 to 10 microns. If thinner than 3 microns, the film loses good heat sealability in forming a fin-seal. If thicker than 10 microns, the film loses rigidity, resulting in poor operability in packaging machines. The surface of high birefringence layer A is preferred to be treated by conventional surface treatment techniques such as corona treatments in air or in inactive gases, such as nitrogen. These treatments improve the chemical activity of the film surface. Surface wetting tension for the layer A preferably ranges from 38 to 50 dynes/cm. This range of wetting tension facilitates various operations such as printing, laminating, or coating on the layer A. If lower than 38 dynes/cm, the surface loses good printability, etc. On the other hand, if higher than 50 dynes/cm, the surface becomes sticky, resulting in poor operability in the packaging machines.

The layer C with low birefringence is not subject to various operations such as printing, because it is located inside of the bag. Therefore, the treatment mentioned above is not always necessary for the surface of layer C. However, light treatment is sometimes effective to promote the bleed-out of additives such as antistatic agents. Hence, surface wetting tension, preferable for the layer C, ranges from 32 to 38 dynes/cm, wherein 32 dynes/cm is the value for the non-treated surface of an EPC layer. Higher values, greater than 38 dynes/cm, are not preferred for the surface of layer C, because it causes blocking between inner sides of the bag and it usually lowers heat seal strength. Surface wetting tension is measured by the method of ASTM D-2578-67T.

EPC in this invention is a copolymer comprising principally units of propylene and ethylene. Preferable ethylene content in the copolymer is from 1 to 4 weight % based on the total weight of the copolymer. If ethylene is less than 1 weight %, heat sealability becomes bad. On the contrary, if ethylene content is more than 4 weight %, "hot-tack", "blocking" and "scratches" become bad. Ethylene content in the copolymer can be measured by the infared absorption band at 731 cm$^{-1}$, with the use of 973 cm$^{-1}$ band as a standard absorption. Random copolymer is preferred for this invention because it is better in heat sealability and clarity. The degree of randomness can be measured by the infared absorption ratio of (720 cm$^{-1}$/731 cm$^{-1}$). This ratio, i.e., (absorption at 720 cm$^{-1}$/absorption at 731 cm$^{-1}$) is called the "randomness index". The value of randomness index preferable for the present invention is less than 1.0, preferably less than 0.6. Such a copolymer is superior in heat sealability and clarity. The smaller the value of the randomness index, the more suitable the copolymer will be for this invention. The copolymer for the layer A may be the same as or different from that for the layer C. If necessary, any additives and/or other polymers may be incorporated into the copolymer.

Conventional propylene homopolymer is usually used for the core PP-BO layer. However, propylene copolymers containing small amounts (less than 1 weight % based on total weight) of other alphatic olefins (C$_2$-C$_6$) copolymerized therewith can also be used for the core layer. Polypropylene for the core layer preferably has a 90 to 98% isotacticity (measured by the extraction method, using boiling n-heptane) and a melt index of from 0.5 to 20 g/10 minutes (measured by ASTM D-1238-73, condition L, temperature 230° C., load 2160 g). Any well-known additives may be incorporated into this polypropylene. Polyethylene, polybutene-1, or an EPC, which may be the same as that used for the laminated layers of the invention, can be blended with this polypropylene, with the limitation that the amount of blended polymer(s) is less than 10 weight % of the total blend.

The three-layered polypropylene film of this invention can be made, for example, in the following way: Polypropylene and EPC pellets are individually fed into two separate extruders. Two streams of molten polymer join in a polymer conducting pipe or in the die to form a two-layered sheet passing through the die, i.e., the two-layered sheet is made by co-extruding the polypropylene and EPC. This sheet is longitudinally stretched from 2 to 6 times its original length at a temperature of from 110° to 150° C. If the stretching ratio is lower than 2, longitudinal gauge uniformity becomes poor. On the contrary, if the ratio is higher than 6, the stretched sheet is likely to break during the following transverse stretching step.

Next, molten EPC is extrusion-laminated onto the polypropylene side of the longitudinally stretched sheet, resulting in the formation of a three-layered sheet. This sheet is led into a tenter oven and transversely stretched from 4 to 12 times its original length at a temperature of from 140° to 165° C. If the transverse stretching ratio is lower than 4, transverse gauge uniformity becomes poor. On the contrary, if the ratio is higher than 12, the film tends to break during transverse stretching.

Three-layered film thus stretched is then heatset at a temperature of from 140° to 165° C. for from 2 to 15 seconds. This heatsetting step is effective to improve the heat sealability of the film. Heatsetting may be carried out under tension or under such conditions that stretched film is longitudinally and/or transversely relaxed, to give a predetermined shrinkage during heatsetting. It is preferred for the heatset film to be rapidly quenched to obtain better heat sealability and clarity. It is also preferred after heatsetting to give the film some surface treatments, such as corona-treatment. Such surface treatments are particularly important for the co-extruded EPC side (layer A), because this side is usually subjected to printing.

One of the most preferred embodiments of this invention is described below.

The two polymers used have the following properties: Polypropylene: Propylene homopolymer having 97% isotacticity and a melt index of 2 g/10 minutes. Phenolic antioxidants and non-ionic antistatic agents are incorporated in the polymer. EPC: Random copolymer consisting of 3 weight % ethylene and 97 weight % propylene, having a melt index of 10 g/10 minutes and a randomness index of 0. Phenolic antioxidants and antiblocking agents (inorganic fillers) are incorporated in the polymer.

These two polymers are fed into the two extruders respectively, and melt-extruded at a temperature of from 250° to 280° C. Two streams of molten polymer from the extruders join in a die to form a two-layered sheet. This molten sheet from the die is chilled and solidified on a chill roll with the surface temperature of 30° C. The obtained sheet is a co-extruded two layered sheet of polypropylene and EPC. This sheet is preheated to 130° C. by contacting it to preheating rolls, and, then, longitudinally stretching it to five times its original length under irradiation of infra-red heaters.

Molten EPC is extrusion-laminated onto the polypropylene side of the longitudinally stretched sheet to form a three-layered sheet. This sheet is transversely stretched to nine times its original width in a tenter oven, wherein heated air at 160° C. is circulating.

The stretched film is then heatset in the heated air at 162° C. for seven seconds, while permitting the film to relax in width by a factor of 8% of its stretched width. The heatset film is then quenched rapidly by contact with quenching rolls kept at 20° C. The extruded EPC side of this film is then corona-treated in a nitrogen atmosphere. Preferred treatment strength is 20 watt-minutes/m$^2$. The treated film is then wound on a paper core. This three-layered film consists of a 1.0 micron co-extruded EPC layer, a 34 microns polypropylene core layer, and a 5 microns extrusion-laminated EPC layer. Hence, total thickness of this film is 40 microns. Birefringence value is 0.0050, 0.0160 and 0.0003 for the co-extruded EPC layer, the core polyproylene layer and the extrusion-laminated EPC layer, respectively. Surface wetting tensions are 41 and 32 dyne/cm for the co-extruded EPC layer and the extrusion-laminated EPC layer, respectively. Dry macaronis are packaged with this film, in the vertical "form and fill" type packaging machine. The film is set in such a way that the extrusion-laminated EPC side forms the inside of the bag. The top and bottom of the bag are fin-sealed, i.e., the inner layer is sealed with the facing inner layer. The back of the bag is lap-sealed, i.e., the inner layer is sealed with the outer layer.

The conditions in the preferred embodiment described above illustrate the invention, and are not intended to be used for restricting the scope of the present invention.

EXAMPLE 1

The following two polymers are used:
Polypropylene: A blend of 98 weight % propylene homopolymer and 2 weight % EPC mentioned below. The homopolymer has an isotacticity of 96.5% and a melt index of 2.5 g/10 minutes. It contains 0.2 weight % of phenolic antioxidant and 0.1 weight % of a metallic salt of a higher fatty acid.

EPC: A random copolymer consisting of 3.4 weight % ethylene and 96.6 weight % propylene, having a melt index of 8 g/10 minutes and a randomness index of 0.10.

This copolymer contains 0.1 weight % phenolic antioxidant and 0.05 weight % fine particles of silica.

The polypropylene and EPC are co-extruded at a temperature of from 250° to 270° C. to form a two-layered sheet. This sheet is longitudinally stretched from 4.5 to 5.0 times its original length at a temperature of from 120° to 140° C. Molten EPC is extrusion-laminated onto the polypropylene side of the stretched sheet, to form a three-layered sheet, which is, then, transversly stretched to 8.5 times its original width at a temperature of from 140° to 160° C. in a tenter oven. The streched film is then heatset at from 150° to 165° C. for six seconds followed by rapid quenching. The co-extruded EPC side (layer A) of this film is then corona-treated at a strength of 25 watt-minutes/m². No treatment is given to the extrusion-laminated EPC side (layer C) of this film. The three-layered film thus obtained consists of a 1.5 microns layer A, a 34 microns core layer of polypropylene, and a 4.5 microns layer C, for a total thickness of 40 microns.

The birefringence value in layer A or layer C can be varied by changing the conditions within the ranges mentioned above, such as longitudinal stretching ratio and temperature, transverse stretching ratio and temperature, and the heatsetting temperature. By changing these conditions, eleven kinds of three-layered film with different birefringence values are made, properties of which are summarized in Table 1. Two kinds of film made by prior art methods are also shown in Table 1 for comparison purposes, viz.:

Film X (prior art): This is made in such a way that a three-layered sheet, EPC/polypropylene/EPC, is formed by co-extrusion, which is then biaxially stretched and heatset; and Film Y (prior art): This is made in such a way that a longitudinally stretched polypropylene sheet is extrusion-laminated with EPC on both sides, followed by being transversely stretched and heatset.

these prior art films are poorer in practical applications than the films of the present invention.

EXAMPLE 2

Packaging tests are carried out, using film no. 1 of Table 1 in Example 1. The surface wetting tension of this film is 42 dyne/cm for layer A and 32 dyne/cm for layer C. The surface of layer A is printed with conventional ink in a gravure-roll type printing machine, resulting in good performance printing. Peanuts are packaged with this printed film in the vertical "form-and-fill" type packaging machine. The film is set in such a way that layer A forms the outside and layer C forms the inside of the bag. The top and bottom of the bag are heat sealed by fin-sealing C layers, and the back of the bag by lap-sealing A and C layers. The packages are made very well, without any troubles such as "hot-tack". Packages thus obtained have a nice appearance and a good heat seal strength in every heat sealed part.

EXAMPLE 3

The following three kinds of polymers are used:
Polypropylene: A homopolymer of propylene having an isotacticity of 87.2% and a melt index of 2.2 g/10 minutes.
The following additives are incorporated:
Phenolic antioxidant: 0.1 weight %
Betaine derivative as an antistatic agent: 0.5 weight %
Amide of higher fatty acid: 0.1 weight %
EPC(1): A random copolymer of 98 weight % propylene and 2 weight % ethylene, having a melt index of 10 g/10 minutes and a randomness index of 0.20. The following additives are incorporated:
Phenolic Antioxidant: 0.1 weight %
Fine particles of silica: 0.05 weight %
EPC(2): A random copolymer of 96.8 weight % propylene and 3.2 weight % ethylene having a melt index of 11 g/10 minutes and a randomness index of Table 1

| Film No. | Birefringence × 10⁴ Layer A | Birefringence × 10⁴ Layer C | Heat Seal Strength (g/cm) Layer C to C | Heat Seal Strength (g/cm) Layer A to C | Resistance Against "Hot-Tack" | Resistance Against "Blocking" | Resistance Against "Scratches" |
|---|---|---|---|---|---|---|---|
| 1 | 35 | 0 | 410 | 270 | Good | Good | Good |
| 2 | 35 | 5 | 400 | 260 | Good | Good | Good |
| 3 | 35 | 10 | 340 | 220 | Good | Good | Good |
| 4 | 35 | 20 | 260 | 150 | Good | Good | Good |
| 5 | 7 | 5 | 400 | 300 | Poor | Poor | Poor |
| 6 | 15 | 5 | 400 | 290 | Acceptable | Acceptable | Acceptable |
| 7 | 30 | 5 | 400 | 280 | Good | Good | Good |
| 8 | 60 | 5 | 400 | 240 | Good | Good | Good |
| 9 | 100 | 5 | 400 | 230 | Excellent | Excellent | Excellent |
| 10 | 150 | 5 | 400 | 200 | Excellent | Excellent | Excellent |
| 11 | 170 | 5 | 400 | 110 | Excellent | Excellent | Excellent |
| X | 60 | 60 | 220 | 120 | Good | Good | Good |
| Y | 4 | 4 | 400 | 310 | Poor | Poor | Poor |

The results in Table I show that the suitable range of birefringence value for layer A is from 0.0015 to 0.0150, preferably from 0.0030 to 0.0100, and from 0 to 0.0010 for layer C, so as to get good heat sealability and good resistance against "hot-tack", "blocking" and "scratches".

Prior art film X is superior in resistance against "hot-tack", etc., but inferior in heat sealability. On the other hand, prior art film Y is superior in heat sealability but inferior in resistance against "hot-tack", etc. Therefore, 0. The same additives are used as in EPC(1).

The polypropylene and EPC(1) are co-extruded at a temperature of from 250° to 280° C., to form a two-layered sheet. This sheet is preheatd to 135° C. and then, longitudinally, stretched to 5 times its original length under the infrared radiation. Next, molten EPC(2) is extrusion-laminated onto the polypropylene side of the stretched sheet to form a three-layered sheet, which is then transversely stretched to 9 times its original width in a tenter oven where heated air is circulating at 155° C. The stretched film is then heatset at 160° C. for three seconds while permitting the film to relax in width by a factor of 8% of its stretched width, followed by additional heatsetting at the same temperature for three seconds without relaxation. Then, the heatset film is quenched by contacting it to quenching rolls kept at 20° C. The EPC(1) side of this film is then corona-treated at a strength of 20 watt-minutes/m$^2$ in a nitrogen atmosphere. During corona-treatment, the film is kept at 90° C. The three-layered film thus obtained has a total thickness of 40 microns, and the following characteristics:

|  | Thickness (microns) | Birefringence | Surface Wetting Tension (dyne/cm) |
| --- | --- | --- | --- |
| EPC(1) layer (Layer A) | 1.0 | 0.0070 | 40 |
| EPC(2) layer (Layer C) | 5.0 | 0.0001 | 32 |

The surface of layer A is printed with conventional ink, resulting in good printing performance. This printed film is set in the bag-making machine to make bags with a gusset at the sides. The bag-making process runs very well, without any "hot-tack" trouble when the film is set in such a way that the layer A forms the outside of the bag.

The bags thus obtained have satisfactory heat seal strength in every heat sealed part and good resistance against "blocking" and "scratches". Another advantage of these bags is that the four gusseted corners of the bag are beautifully and tightly formed, because the outer layer (layer A) of the bag is also heat sealable. A further advantage of these bags is that they are easily arranged on the shelf, because the four gusseted corners do not open and, hence, the shape of the bag becomes cubic after packaging.

We claim:

1. A three-layered heat sealable polypropylene film comprising a core layer of biaxially oriented polypropylene sandwiched between biaxially oriented ethylenepropylene copolymer layer (A) and uniaxially oriented ethylenepropylene copolymer layer (C) wherein the ethylene-propylene copolymers contain from 1 to 4 weight % ethylene, units based on total weight of the copolymer, and wherein the birefringence value of said layer (A) ranges from 0.0030 to 0.0100 and the birefringence value of said layer (C) ranges from 0 to 0.0010.

2. The three-layered film of claim 1, wherein the copolymer is a random copolymer of ethylene and propylene with a randomness index below 1.0.

3. The three-layered film of claim 2, wherein the ethylene-propylene copolymer has a randomness index of below 0.6.

4. The three-layered film of claim 1, wherein the ethylene-propylene copolymer layer with the lower value of birefringence is from 3 to 10 microns thick, and the other copolymer layer, with the higher value of birefringence, is from 0.5 to 3.0 microns thick.

5. The three-layered film of claim 1, where the copolymer layer with the lower value of birefringence has a wetting tension of from 32 to 38 dynes/cm at the surface, and the other copolymer layer, with the higher value of birefringence, has a wetting tension of from 38 to 50 dynes/cm at the surface.

6. A bag formed from a three-layered film comprising a core layer of biaxially oriented polypropylene sandwiched between biaxially oriented ethylenepropylene copolymer layer (A) and uniaxially oriented ethylene-propylene copolymer layer (C) wherein the birefringence value of said layer (A) ranges from 0.0030 to 0.0100 and the birefringence value of said layer (C) ranges from 0 to 0.0010, said bag being constructed in such a way that the copolymer layer with the lower birefringence value forms the inside of the bag, and the back of the bag is heat-sealed by heat contact between facing inner and outer layers.

* * * * *